METAL OFFSET PLATE AND METHOD FOR MANUFACTURE

Filed Feb. 7, 1963

Julian Lee Beatty
Seamon A. Lincoln
INVENTORS

BY Dorns, McDougall and Hersh
Att'ys 3,298,852

METAL OFFSET PLATE AND METHOD FOR MANUFACTURE

Julian Lee Beatty, Northbrook, and Seamon A. Lincoln, Wheaton, Ill., assignors to A. B. Dick Company, Niles, Ill., a corporation of Illinois Filed Feb. 7, 1963, Ser. No. 257,020
10 Claims. (Cl. 117—34)

This invention relates to lithographic plates formed of a metal such as aluminum or other amphoteric metal and it relates more particularly to a direct image or a photolithographic aluminum plate and to the method for the manufacture of same.

Lithographic plates formed of an amphoteric metal such as aluminum have found wide usage in the preparation of imaged lithographic masters because of the exceptionally long life of the imaged lithographic plate whereby as many as 20,000 to 60,000 copies can be produced from a single imaged plate because of the high dimensional stability of the aluminum whereby image registration can be maintained notwithstanding the repeated wetting of the plate with aqueous etch and repellent solutions such as are conventionally employed in the use of the plate in the production of copy, and because of the ability of the plate, when properly treated, to serve as a base for the preparation of photolithographic plates by coating with conventional light-sensitive, resin-forming diazo compounds and the like. Aluminum or other metal plates enjoy wide acceptance in the lithographic printing art because of the good quality of the copy that is produced, because of the ease of imaging the plate, and because of the retention of the image on the plate under the conditions of use.

In the U.S. Patent No. 2,714,066 description is made of a process for the preparation of a presensitized aluminum lithographic or photolithographic plate wherein the surface of the thin strip of aluminum is treated first with a soluble silicate in solution after preparation of the surface with an etch in the form of an acidic material, to stabilize the surface for the subsequent coating with a light-sensitive diazo compound. In response to exposure to light, the diazo compound in the exposed area is converted to an ink receptive, water repellent imaged portion while the unexposed diazo compound in the unexposed, non-imaged areas washes off during the subsequent rinse to expose the underlying, water receptive, ink repellent, non-imaged portion of the silicated lithographic surface of the aluminum plate.

Production of aluminum plates in the manner described in the aforementioned issued patent serves quite adequately for use as an indirect photolithographic plate but the cost of the plate is relatively high by reason of the multiple steps required in preparation. Such multiple steps lead to a process which is incapable consistently to produce a satisfactory plate. As a result, the resulting photolithographic plates are expensive and incapable of the desired consistency for use in the production of copy of good quality.

It is an object of this invention to produce and to provide a method for the production of lithographic plates formed of a metal such as aluminum or the like amphoteric metals such as copper or zinc, which can be used interchangeably either as a direct image plate or as a base for the production of a presensitized or photolithographic plate.

More specifically, it is an object of this invention to produce and to provide a method for producing an aluminum lithographic plate which makes use of a few simple steps in the preparation thereof; which makes use of low cost and readily available materials in the fabrication of the plate; which is effective consistently to produce a lithographic plate which is capable of strong image retention and capable of long life for use in the production of copy of high quality; which can be used as a direct image plate; which can be processed with conventional materials in the production of a stable photolithographic plate characterized by long shelf life; and which produces a lithographic plate of high dimensional stability, which is capable of use in the production of a large number of copies of good quality and which is simple in construction and operation thereby to enable greater flexibility in the operating conditions under which the plate is used without detracting from the character or number of copies produced.

These and other objects and advantages of this invention will hereinafter appear and, for purposes of illustration, but not of limitation, an embodiment of the invention is shown in the accompanying drawing in which.

Figure 1:
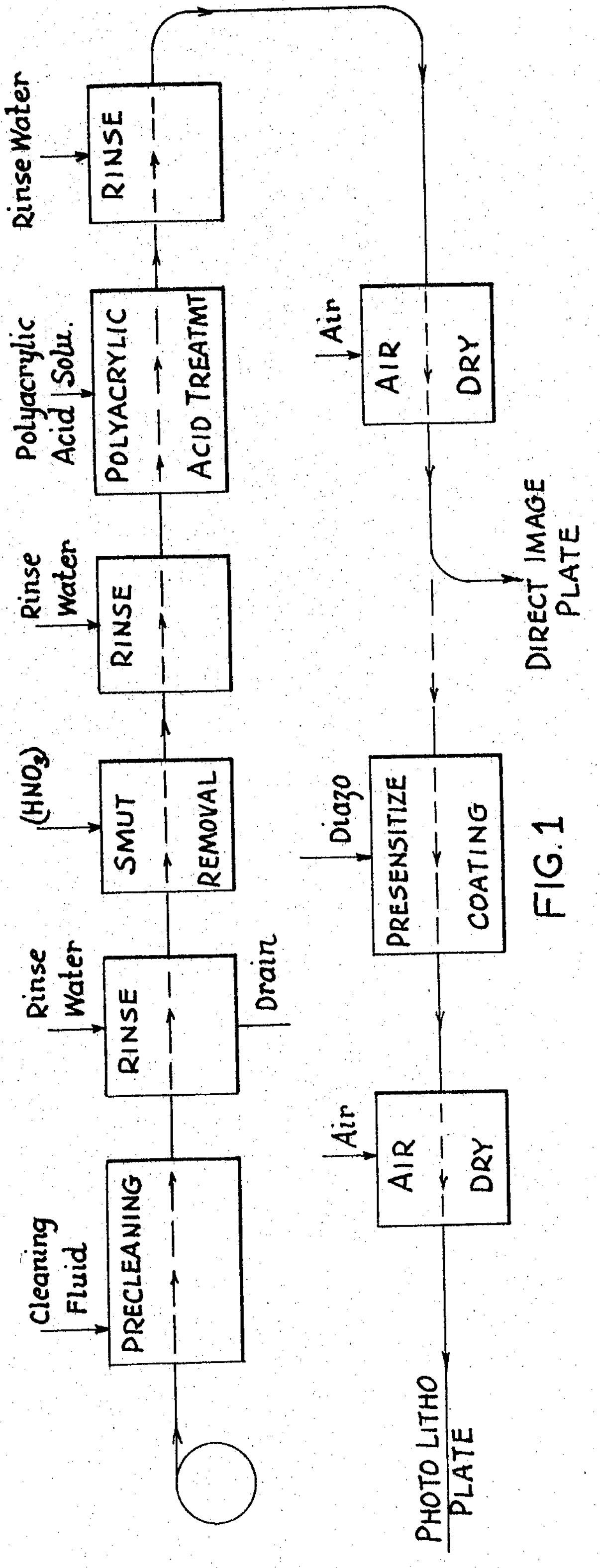
FIG. 1 is a flow sheet illustrating the practice of this invention in the preparation of a direct image lithographic plate.
Figure 3:
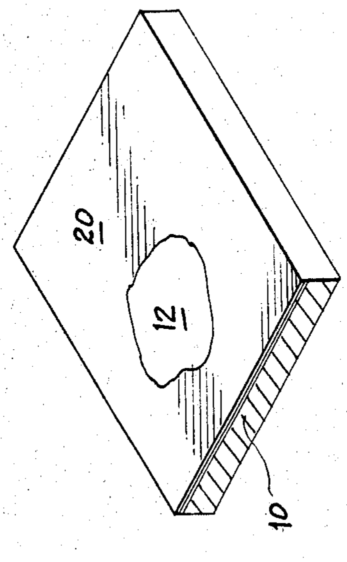
FIG. 3 is a perspective view partially in section of a plate prepared in accordance with the practice of this invention for use as a photolithographic plate.
Figure 2:
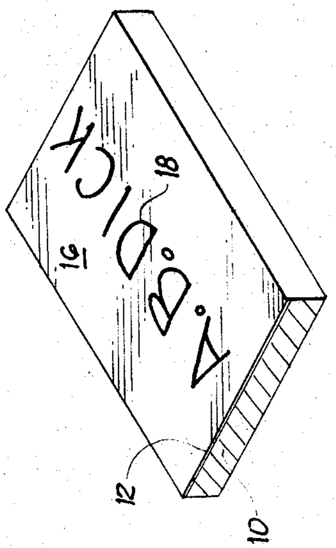
FIG. 2 is a perspective view partially in section of a lithographic plate prepared in accordance with the practice of this invention for use as a direct image plate.

This invention will be described with reference to the preparation of a lithographic plate of flexible sheet aluminum 10 having a gauge of 3 to 10 mils, but it will be understood that the concepts of this invention will have application to aluminum sheet or plates of heavier gauge and that instead of aluminum use can be made of other amphoteric metals such as zinc, copper, etc. Metal films of lesser gauge can be employed when laminated to a suitable backing such as a backing of paper, plastic, film or the like.

The following example will illustrate the practice of this invention in the preparation of a direct image lithographic plate:

*Example 1*

*Precleaning step.*—The aluminum surface 10, in the form of an aluminum strip, or as separately cut sheets of aluminum or laminate, is first cleaned to remove oils, greases, smut or other materials collected or otherwise formed on the surface during the rolling or sheeting steps. Such precleaning steps can make use of conventional cleaning materials such as solvents, alkalies or acids or combinations thereof. It is preferred to make use of a cleaning fluid of the alkaline etch type as represented by the following formula:

| | Percent by wt. |
|---|---|
| Trisodium phosphate | 20 |
| Sodium gluconate | 1 |
| Water | 79 |

For this purpose, the cleaning solution or composition can be applied to the surface of the plate by a spray or flow coat process but it is preferred to effect cleaning by immersion of the aluminum sheet into a cleaning bath as by passage of the continuous strip through a bath of the liquid cleaning composition. With the cleaning composition of Example 1, cleaning is effected by immersion in a bath maintained at a temperature of about 175° F. One or as many as six passes can be made to insure substantially complete removal of contaminants.

Following surface cleaning or the surface preparation step, the cleaned surface is rinsed with water or other aqueous medium to remove residual salts. Rinsing to remove residual salts can be achieved by washing with the aqueous medium or by a spray or flow coat process or by passing the cleaned aluminum sheet through a bath of the rinsing liquid.

When use is made of an alkaline solution of trisodium phosphate as the cleaning bath, a smut may form on the treated surface of the aluminum. This smut can be removed by treatment of the rinsed surface with a concentrated solution of nitric acid (60–70% $HNO_3$) followed by a tap water rinse to remove residual acids.

*Treating step.*—The cleaned aluminum surface is thereafter treated with a polyacrylic acid in solution in aqueous medium. For this purpose, use can be made of a solution containing from 0.1 to 1.5 percent by weight of polyacrylic acid but it is preferred to make use of a coating solution containing the polyacrylic acid in an amount within the range of 0.15 to 0.75 percent by weight.

Treatment with the polyacrylic acid solution to provide the top coat 12 can be made by a flow coat process but it is preferred to immerse the cleaned aluminum sheet into the solution of polyacrylic acid for exposure for a length of time ranging from 15 to 300 seconds at a temperature of about 150° F. to 212° F. and preferably from 30 to 90 seconds at a temperature of 200° F.±5° F.

The plates 14, treated with the solution of polyacrylic acid, are then rinsed with tap water and air dried, preferably with clean air which previously has been freed of oleaginous or other hydrophobic materials. The surface 12 of the dried plate will be characterized by permanent hydrophilic properties, that is, it will be ink repellent, water receptive and lithographic to represent a lithographic surface that can be imaged with a hydrophobic, ink receptive, water repellent material. Thus when the imaged plate is mounted on a lithographic press and processed in the conventional manner by sequential wetting with aqueous repellent and an oleaginous ink, the aqueous material will wet out the non-imaged, hydrophilic, ink repellent portions 16 of the plate while the ink composition will wet out the non-wetted ink receptive, water repellent, imaged portion 18 of the plate.

In the practice of this invention, it is desirable to make use of a polyacrylic acid treating solution which has a pH of less than 4. A solution in aqueous medium containing polyacrylic acid in the amount described will normally have a pH lying within the preferred range of between 2–3. Compositions having a lower pH can be obtained by modification to add organic or inorganic acids.

While treating solutions containing higher concentrations of polyacrylic acid than the amounts previously described can be employed in the treatment of the cleaned surface of the aluminum plate, the use of solutions containing polyacrylic acid in amounts greater than 1.5 percent by weight operate undesirably to slow the reaction of surface treatment and it also raises problems in rinsing the coated surface of the plate after treament with the polyacrylic acid solution.

The time and temperature of treatment of the cleaned aluminum surface with the polyacrylic acid solution can be varied over a fairly wide range. At the preferred temperature of 200° F.±5° F., the time of treatment can be varied from 15 to 300 seconds with the treatment time of 30 to 60 seconds being preferred. Temperatures less than 200° F. can be employed but then the treatment time is considerably increased. Little, if any, effect is secured by the polyacrylic acid treatment when it is carried out at a temperature less than 150° F. since the resulting aluminum surface is thereby not rendered uniformly and permanently hydrophilic.

A direct image plate prepared in accordance with the foregoing description can be imaged by conventional means, such as by means of a lithographic typewriter ribbon or transfer sheet having a transfer coating of an ink receptive, water repellent imaging material for die impression or stylus work, or by a lithographic ink, crayon, pencil or the like.

The plate prepared in accordance with the foregoing can also be used as a light sensitive, presensitized, or photolithographic plate as by the coating of the treated surface of the direct imaged plate with a light sensitive material that is reduced to an ink receptive, water repellent, imaged material in the areas of the coated plate that are exposed to the light.

As a light sensitive material, use can be made of the water soluble, resin forming diazo compounds or compositions of the types described in the aforementioned issued patent.

The following is an example of the preparation of a photolithographic plate embodying the features of this invention:

*Example 2*

The process of Example 1 is carried out in accordance with the teachings of Example 1 to produce the direct imaged lithographic plate. The plate prepared in Example 1 having the polyacrylic acid—aluminum reaction product on the surface is coated with the following composition to provide a coating weight of about 3 to 8 grams per $10^6$ square inches and preferably 4 to 6 grams per $10^6$ square inches:

| | Percent by weight |
|---|---|
| Paradiazo diphenyl amine—formaldehyde condensate | 0.1–2.0 |
| Acetone | 10 |
| Wetting agent (Peregal O) | 0.2 |
| Stabilizer (citric acid) | 0.24–0.36 |
| Remainder water. | |

The composition is coated in the described coating weights onto the polyacrylic acid treated surface by a dip squeeze process in a bath of the sensitizing composition. Coating is followed by air drying to produce a light sensitive photolithographic coating 20 which can be used to prepare an ink receptive, lithographic plate by conventional photolithographic techniques.

There is reason to believe that the polyacrylic acid reacts with the aluminum in the surface of the plate to form a coating which may be as little as 100 millimicrons in thickness or even less, or else forms a substantially monomolecular layer of the polyacrylic acid on the metal surface which layer may be thicker than monomolecular. Whatever the reason, it is known that the treated surface becomes stably lithographic for use as a direct image plate or stably lithographic as a base for diazo compounds applied in the production of a lithographic plate.

It will be apparent from the foregoing that we have provided a new and simple means for treatment of the surface of aluminum plates to render such surface permanently lithographic for use as a direct image plate or for use as a stabilized surface upon which a light sensitive image forming material can be provided as a continuous coating on the surface thereof to produce a new and improved photolithographic plate.

It will be understood that changes may be made in the details of construction, arrangement and operation without departing from the spirit of the invention, especially as defined in the following claims.

We claim:

1. In the process of manufacturing an aluminum lithographic plate, the steps in the order specified of thoroughly cleaning the surface of the aluminum plate, treating the cleaned surface of the aluminum plate with an aqueous solution containing 0.1 to 1.5 percent by weight polyacrylic acid with the remainder substantially water while the solution is at a pH less than 4 and at a temperature within the range of 150° to 212° F. for a period of time within the range of 15 to 300 seconds, drying the treated surface and rinsing the surface with aqueous medium to remove soluble salts, and then again drying the rinsed surface.

2. The process as claimed in claim 1 in which the pH of the solution is within the range of 2 to 3.

3. The process as claimed in claim 1 in which the concentration of polyacrylic acid in the solution is within the range of 0.15 to 0.75 percent by weight.

4. The process as claimed in claim 1 in which the treatment with the polyacrylic acid solution is carried out for a time within the range of 30 to 90 seconds.

5. The process as claimed in claim 1 in which the treatment is carried out at a temperature of 200° F.±5° F.

6. In the process of manufacturing an aluminum photolithographic plate, the steps in the order specified of thoroughly cleaning the surface of the aluminum plate, treating the cleaned surface of the aluminum plate with aqueous solution containing 0.1 to 1.5 percent by weight polyacrylic acid with the remainder being substantially water while the solution is at a pH less than 4 and at a temperature within the range of 150° to 212° F. for a period of time within the range of 15 to 300 seconds, drying the treated surface, rinsing the surface with aqueous medium to remove soluble salts, drying the rinsed surface, and then coating the surface with a water soluble light-sensitive diazo compound which converts to an ink receptive, water repellent, imaging material upon exposure to light.

7. The process as claimed in claim 6 in which the pH of the solution is within the range of 2 to 3.

8. The process as claimed in claim 6 in which the concentration of polyacrylic acid in the solution is within the range of 0.15 to 0.75 percent by weight.

9. The process as claimed in claim 6 in which the treatment with the polyacrylic acid solution is carried out for a time within the range of 30 to 90 seconds.

10. The process as claimed in claim 6 in which the treatment is carried out at a temperature of 200° F.±5° F.

References Cited by the Examiner

UNITED STATES PATENTS

| | | | |
|---|---|---|---|
| 2,681,310 | 6/1954 | Wood. | |
| 2,714,066 | 7/1955 | Jewett et al. | 96—33 X |
| 2,760,431 | 8/1956 | Beatty | 96—33 X |
| 2,946,683 | 7/1960 | Mellan et al. | 96—33 X |
| 3,136,636 | 6/1964 | Dowdall et al. | 96—86 |

FOREIGN PATENTS

| | | |
|---|---|---|
| 951,496 | 10/1949 | France. |
| 815,471 | 6/1959 | Great Britain. |

ALFRED L. LEAVITT, *Primary Examiner.*

NORMAN G. TORCHIN, *Examiner.*

R. L. STONE, A. H. ROSENSTEIN, *Assistant Examiners.*